Aug. 15, 1939.  E. W. CARROLL  2,169,353
FRUIT PROCESSING APPARATUS
Filed March 30, 1937  2 Sheets-Sheet 1
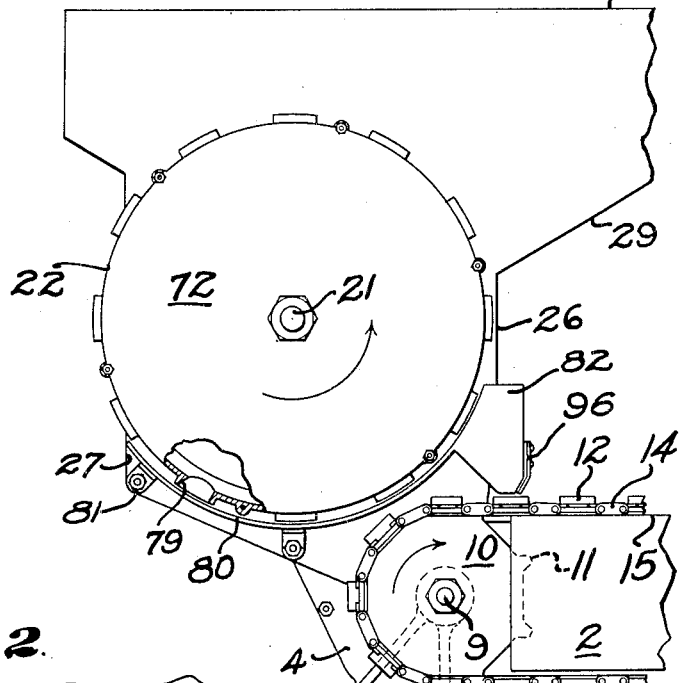
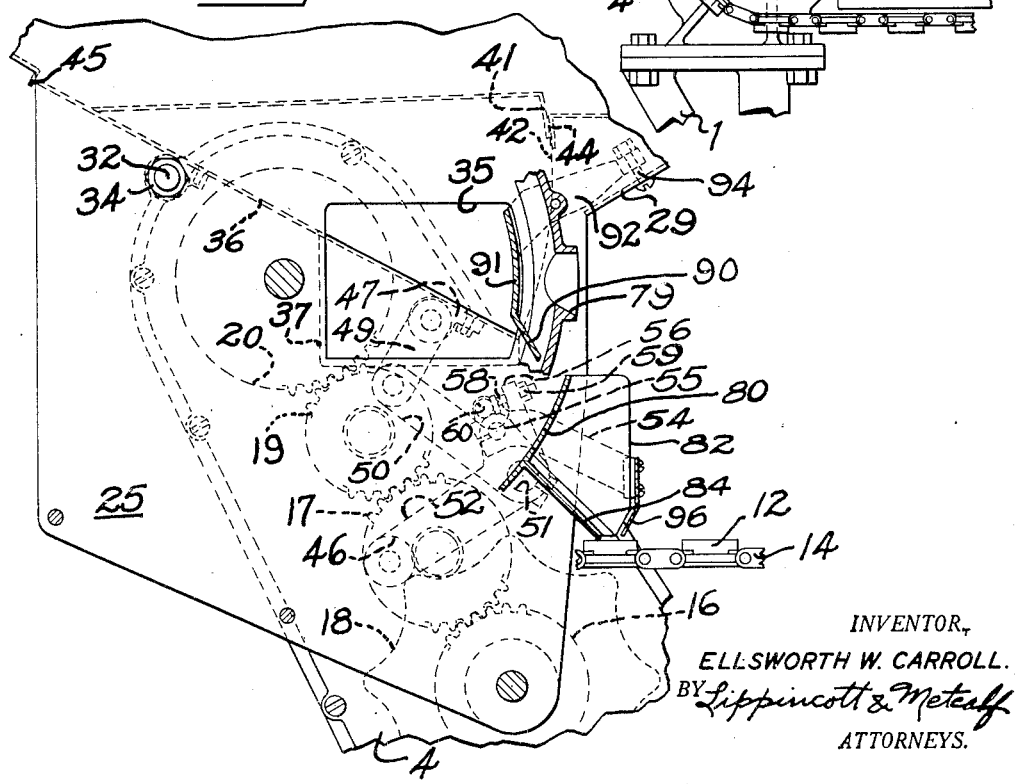
INVENTOR,
ELLSWORTH W. CARROLL.
BY Lippincott & Metcalf
ATTORNEYS.

Aug. 15, 1939.  E. W. CARROLL  2,169,353
FRUIT PROCESSING APPARATUS
Filed March 30, 1937  2 Sheets-Sheet 2
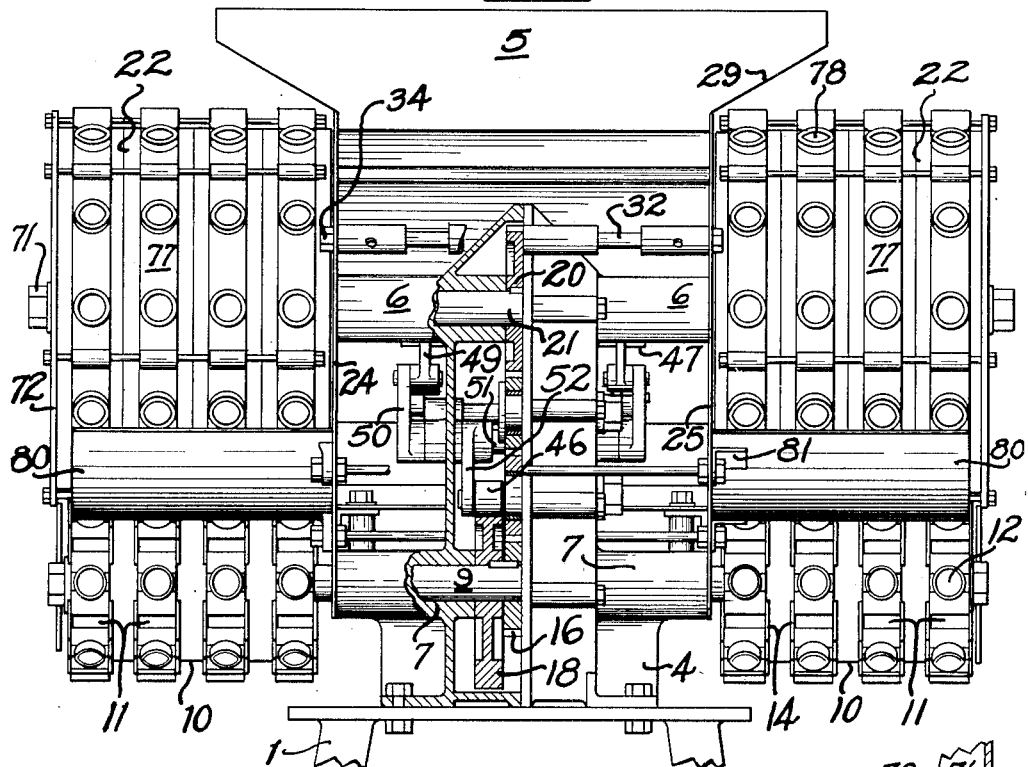
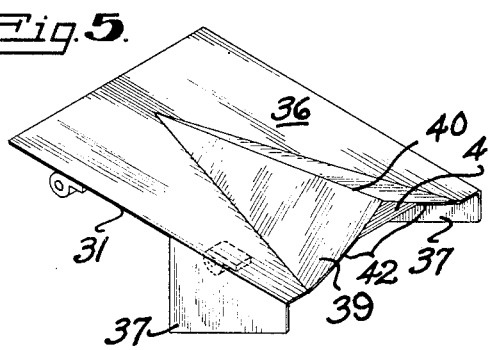
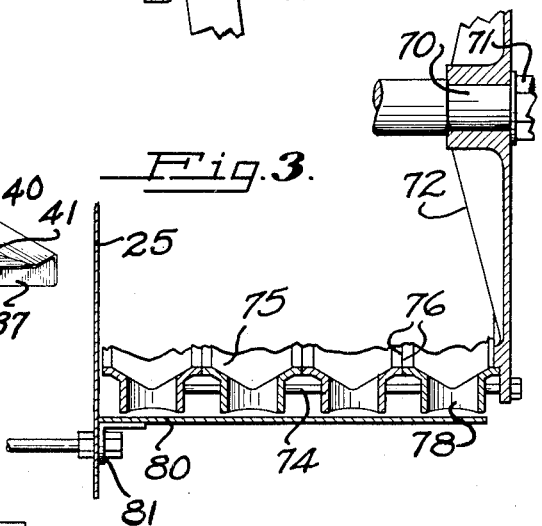
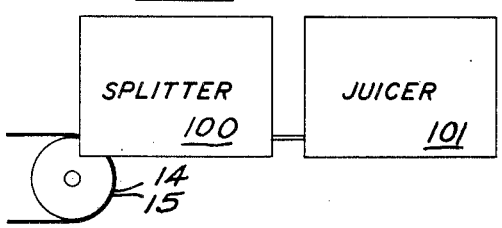
INVENTOR,
ELLSWORTH W. CARROLL.
BY Lippincott & Metcalf
ATTORNEYS.

Patented Aug. 15, 1939

2,169,353

UNITED STATES PATENT OFFICE 2,169,353

FRUIT-PROCESSING APPARATUS

Ellsworth W. Carroll, San Francisco, Calif., assignor to Sussman, Wormser & Co., San Francisco, Calif., a corporation of California Application March 30, 1937, Serial No. 133,806

8 Claims. (Cl. 198—56)

My invention relates to food processing machinery, and particularly to a device for removing pits from small fruit, such as cherries.

Among the objects of my invention are: To provide improved means for processing small fruit; to provide means for delivering such fruit to a conveyor at accurately predetermined intervals; to provide a feeding mechanism which will not clog; to eliminate "bridging" of fruit within a feeding mechanism; and to provide means for simultaneously distributing fruit to a plurality of conveyor belts.

Other objects of my invention will be apparent or will be specifically pointed out in the description forming a part of this specification, but I do not limit myself to the embodiment of the invention herein described, as various forms may be adopted within the scope of the claims.

Briefly as to apparatus, my invention comprises a mechanism for spacing fruit to be pitted, or otherwise processed, upon a conveyor in accurately spaced relationship, and is particularly designed to operate in connection with the mechanism disclosed in the patent to Ellsworth W. Carroll and Herschel M. Connor, No. 2,092,956, dated September 14, 1937, entitled "Fruit pitter".

In that application, there was shown a preferred form of punching mechanism operating upon fruit such as cherries, the cherries being supported individually by rubber cups having a special lubricant therein and having a form suitable for acting as a chain conveyor. The proper positioning of the cherries within the cups was obtained by the combined action of gravity and the special lubricant used.

The present application is directed to the means for feeding the cherries onto the cup chain in proper spacing, accomplishing the result by allowing the cherries to enter a spacing ring and expelling them therefrom onto the cup chain at proper intervals.

These means are shown in the drawings, in which a central hopper is bounded on either side by a distributing head feeding a number of conveyor chains.

Figure 1 shows a side elevation of the distributing head end of the machine.

Figure 2 is a side elevation of the hopper, with a portion of the distributing mechanism shown in section.

Figure 3 is a sectional view of a portion of the distributing drum.

Figure 4 is an end elevation, partly in section, of the distributing head end of the machine.

Figure 5 is a perspective view of the movable hopper bottom.

Figure 6 illustrates a modification adapted to extract juice from oranges.

In practice, the pitter referred to above is set up at one end of a conveyor table having a plurality of parallel guideways upon which the conveyor chains may travel, and the distributing and spacing mechanism to be described hereafter is set up at the opposite end of said table.

Proper alinement of the spacing mechanism with the conveyor chains and pitters is most easily maintained by utilizing a common supporting framework, but it is quite within the scope of my invention to utilize separate supporting means for the different elements. Such a preferred frame has been indicated in Figures 1 and 4 of the drawings, which show in side and end views respectively the proper relation between distributing mechanism and conveyor table.

The common supporting frame 1 carries one end of the conveyor table 2 and a hollow housing 4 which acts as a support for a hopper 5 and as a gear case and bearing support. Housing 4 is so constructed as to make an acute angle with the vertical away from table 2, whereby split spacing shaft journal bearings 6, formed integrally through and extending outwardly from the upper portion of said housing 4, are displaced horizontally as well as vertically from split driving shaft journal bearings 7 formed integrally through and extending outwardly from the lower portion of said housing. A main driving shaft 9 is rotatably supported by journals 7, extending equally beyond said journals on the outer ends thereof to support driving drums 10. Driving drums 10 have rows of lugs 11 evenly spaced about the circumferences thereof to guide and motivate endless chains of rubber cups 12 pivotally connected by links 14 as described in my patent application cited supra. These endless chains travel in suitable guideways 15 over table 2 toward pitters, not shown, disposed at the opposite end thereof. Rotation of driving shaft 9 is produced by a motor suitably connected thereto, not illustrated in the drawings, and forming no part of the invention.

Within housing 4, between split bearings 7, a star wheel 18 and a gear 16 are keyed on shaft 9. A train of idler gears 17 and 19 rotatably journaled in housing 4 communicate the movement of gear 16 to a spacing shaft gear 20 keyed to a spacing shaft 21 rotatably supported by bearings 6. Spacing shaft 21 extends evenly beyond the outer ends of journals 6, supporting spacing drums 22.

The outer ends of journal bearings 6 and 7 are machined to define two parallel planes symmetrically positioned relative to housing 4, and to the supporting surfaces thus presented are fastened two flat metal sheets 24 and 25 which form the lower side walls of hopper 5. With the addition of a flat sheet 26 forming a front wall, and sheet 27 forming a rear wall, a closure is provided about the housing 4 and mechanism associated therewith. The sheets 24, 25, 26 and 27 terminate upwardly at their line of intersection with flaring walls 29 having roughly the form of an inverted truncated pyramid, all together forming the hopper 5.

Within hopper 5 is disposed a movable shaker bottom 31, extending between side walls 24 and 25, and pivotally supported upon a shaft 32 fixed by bolts 34 to said side walls 24 and 25. Shaker bottom 31 is designed to agitate the cherries or other fruit placed in hopper 5 and to direct the fruit toward side walls 24 and 25, through each of which an outlet port 35 is disposed, having rolled edges, not shown, to prevent cutting of fruit thereagainst. Agitation is desirable because of the tendency of fruit to jam or bridge in the hopper, preventing further flow through the outlet ports. Shaker bottom 31 is so constructed as to permit free movement about its pivotal axis while preventing fruit from being caught between moving surfaces, and at the same time clearing the housing 4. As shown in Figure 5, a flat bottom portion 36 has ear portions 37 disposed in a plane normal thereto and parallel to side walls 24 and 25. These ear portions are so shaped as to cover the lower portion of outlet ports 35 at all points of the agitational traverse of bottom 31, thereby preventing fruit from passing through the ports 35 in reverse direction and falling into the space bounded by walls 24–27 inclusive. A wedge-shaped segment is excised from the bottom portion 36, and for it is substituted a pair of inclined plates 39 meeting in a ridge 40 along the central axis of plate 36 and sloping downwardly therefrom. The normal position of ridge 40 is horizontal, with plate 36 sloping downwardly toward the front wall 26. A peak plate 41 is disposed across the forward ends 42 of plates 39 to prevent fruit from rolling back under the bottom 31 during its travel; said forward ends are shaped to form an arc of a circle whose center is the shaft 32. A shield 44 of metal is built up to form a close fit with the moving edges 42 at the front of the hopper, and at the rear, a turned down edge 45 of the flaring side 29 accomplishes the same purpose with the flat plate 36.

The bottom 31 is moved through an arc of about an inch by the agency of a mechanical linkage actuated by a roller 46 which rides upon the surface of the star wheel 18. Underneath plate 36, pivotal bearings 47 fixed thereto are disposed on either side of the raised central portion bounded by plates 39; bearings 47 are pivotally connected by links 49 to lever arms 50 fixed one at either end of a shaft 51 rotatably supported by housing 4.

Shaft 51 is caused to rotate through a small arc by a lever 52 fixed thereto and terminating in the star-wheel-engaging roller 46.

The arcuate movement of lever 52 about shaft 51 is also communicated to a release lever 54, pivotally supported by a stub shaft 55 journaled in frame 4. Lever 50 has a shorter lever 56 formed integral therewith but angularly displaced therefrom about shaft 51. Through lever 56 is disposed, normal to shaft 51, a threadably adjustable stop pin 58 held by a lock nut 59. A pin 60 is fixed in lever 54 and extends therefrom parallel to shaft 51 to engage stop pin 58. In consequence, lever 54 is intermittently actuated by star wheel 18, for a purpose to be described post.

Spacing drums 22 are held by shaft 21 so close to side walls 24 and 25 that although there is no frictional contact between drums and walls, it is impossible for fruit to escape from the drums along the portions thereof adjacent the walls. Hence the only means of egress for fruit placed in hopper 5 is through the regular spacing holes in the drums 22, the construction of which will now be described in detail.

The outer ends of shaft 21 terminate in portions 70 of reduced cross-section on which are held, by suitably threaded nuts 71, flanged circular end plates 72. Figure 3 shows an enlarged sectional portion of a spacing drum and end plate. Bolts 74 secure to end plates 72 a number of spacing rings 75 having bolt-receiving apertures spaced about their circumferences. Each of rings 75 comprises a cast metal ring with parallel shoulders 76. Between shoulders 76 there is a raised central portion 77 from which extend radially at uniform intervals spacing apertures 78. At the inner periphery of ring 75 these apertures are circular, but at the outer periphery, these apertures are elongated to provide for each aperture, a trailing edge 79. The size of the aperture is such as to make an easy sliding fit with the cherries or other fruit to be handled, different drums being used for different diameters of material.

Shields 80 formed concentric with drum 22 are held beneath the lower third of each drum by suitable bolts and brackets 81. Each shield is positioned closely enough to drum 22 to prevent cherries which have fallen by gravity into the apertures 78 from falling out again, but not close enough to actually touch the drum. At the forward edge of each shield there is formed a plurality of guideways 82, between each of which extends an inclined bottom 84.

Cherries dropping into drum 22 through port 35 are distributed about by gravity and the rotation of the drum. Along the bottom portion of the drum, gravity causes the apertures 79 to receive each a cherry which is prevented from falling through by shield 80, and is carried along by the rotating drum until reaching the forward edge of the shield. Here the cherry, freed from the sheld's restraint and assisted by the now downwardly sloping trailing aperture edge 79, falls out between guides 82 onto the inclined bottom 84. To remove positively fruit tending to remain in the apertures, I provide a plurality of fingers 90 supported within each drum by a curved plate 91 passing through walls 24 and 25; within the walls, supporting arms 92 carry plates 91, and the separation between fingers 90 and the front edge of shield 80 is controlled by adjusting means 94 attached to hopper wall 29. As the cherries or other fruit have been graded for size before entering my apparatus, there is no danger of injuring the fruit which may be stuck in the apertures, a gentle impact of fruit on finger being sufficient for ejection.

The fruit which has fallen onto inclined bottom 84 between guides 82 is held there by a movable arm 96 extending across the lower edge of all the guides. Arm 96 is fixed to release lever 54, intermittently actuated by the coaction of stop pin 58 and pin 60 as explained above. At the instant that the conveyor chain cups are passing directly beneath the inclined bottom 84 and fingers 96, the release lever 54 is moved upward and the fruit allowed to fall into the cups. By proper adjustment of the release lever and stop pin 58, exact synchronization of release can be obtained, and the fruit dropped in exact registry with the cups.

It will thus be apparent that I have provided means for exactly synchronizing the spacer and conveyor. Fruit is placed on the conveyor in exactly spaced relationship, and an excess can never be delivered since the spacing drum permits removal of the fruit only at a prescribed rate. Fruit cannot become stuck in the spacing drum, due to its constant rotation and the consequent shifting about of the fruit therein, and it is prevented by the constant agitation of the shaker bottom from becoming stuck in the hopper, from which fruit is evenly distributed to each of the spacing drums by virtue of the inclined central portion of the movable bottom.

A modification of my device is suitable for handling oranges and other citrus fruits from which it is desired to extract the juice for commercial purposes. For this use, suitably apertured distributing drums, preferably larger in diameter than those used for small fruit such as cherries, are used and the generalized arrangement is shown in Figure 6. The endless chain feeds the fruit first to a splitter 100 which may include a rotating knife, the details of which may be widely varied. The two separated orange halves are then directed onto a burring apparatus 101, somewhat similar in construction to the pitter referred to above, but with rotating burring blades engaging the halved oranges instead of the pitting punch. The juice may be drained off through suitable conveying means, and further treated as desired, while the shells are made use of for glace' fruit or other purposes. Such structural modifications of the pitting apparatus as would be necessary for this purpose are within the scope of the appended claims.

It is to be recognized that the particular hopper structure shown, the exact arrangement of gears, and the exact form of the supporting housing and spacing drums are matters of mechanical design, and I may modify them materially within the scope of the claims.

It should also be apparent that the device shown is not limited to cherries and similar small fruit, but may be extended to any type of fruit or vegetable of a shape which permits treatment in similar fashion. It is also possible to use my device for distributing articles which are not edibles, and I do not wish to be restricted thereto.

I claim:

1. Means for presenting fruit or the like in spaced relationship for processing, comprising a frame, a hopper supported thereon having opposed parallel sides, a shaft journaled through said frame, and alined spacing drums fixed to said shaft closely adjacent said parallel hopper sides.

2. Means for presenting fruit or the like in spaced relationship for processing, comprising a frame, a hopper supported thereon having opposed parallel sides, a movable bottom fixed pivotally in said hopper, a shaft journaled through said frame, means for agitating said bottom, alined spacing drums fixed to said shaft closely adjacent said parallel hopper sides, and ports disposed through said parallel hopper sides in registry with said spacing drums.

3. Means for presenting fruit or the like in spaced relationship for processing, comprising a frame, a hopper supported thereon having opposed parallel sides, a movable bottom fixed pivotally in said hopper, a shaft journaled through said frame, means for agitating said bottom, alined spacing drums fixed to said shaft closely adjacent said parallel hopper sides, each of said spacing drums comprising a flanged circular member fixed to an end of said shaft, a number of spacing rings positioned concentrically about said shaft, bolts securing said rings to said flanged member and having a plurality of evenly spaced apertures radially disposed through said rings; and ports disposed through said parallel hopper sides centrally opposite said drums.

4. Means for presenting fruit or the like in spaced relationship for processing, comprising a frame, a hopper supported thereon having opposed parallel sides, a movable bottom fixed pivotally in said hopper, a shaft journaled through said frame, means for agitating said bottom, alined spacing drums fixed to said shaft closely adjacent said parallel hopper sides, each of said spacing drums comprising a circular member centrally fixed to said shaft and a plurality of spacing rings fixed to said member concentrically about said shaft, and a plurality of radial apertures spaced symmetrically through each of said rings, and ports disposed through said parallel hopper sides into said spacing drums.

5. Means for presenting fruit to be processed to a fruit processing device in spaced relationship, comprising a frame, a hopper supported thereon having apertured parallel sides and a movable bottom pivotally fixed therebetween, said bottom having an apical portion parallel to said sides centrally disposed between side portions sloping outwardly and downwardly therefrom, an idler shaft journaled in said frame, cranks terminally connected to said side portions of said bottom and rotatably supported about said idler shaft, a roller terminating the unconnected crank end, a main shaft journaled in said frame, a star wheel keyed thereon, said idler shaft and main shaft being so positioned that said roller engages said star wheel, whereby rotation of said main shaft produces agitation of said bottom; a driven shaft journaled through said frame, gears fixed upon said main shaft, said idler shaft, and said driven shaft, so positioned and arranged that rotation of said main shaft produces corresponding rotation of said driven shaft, spacing drums disposed upon said driven shaft closely adjacent said parallel hopper sides, each of said spacing drums comprising a circular member centrally fixed to said shaft and a plurality of spacing rings fixed to said member concentrically about said shaft, and a plurality of radial apertures spaced symmetrically through each of said rings; ports disposed through said parallel hopper sides into said spacing drums, ejecting means associated with said spacing rings, driving drums disposed upon said main shaft symmetrically about said frame, a plurality of conveyor-chain-driving teeth thereon, a plurality of conveyor chains disposed thereupon, said teeth being so positioned and arranged that said chains are alined with said spacing rings, and guideways supported upon said frame in external registry with said spacing ring apertures.

6. In combination with apparatus substantially as described, rotatable spacing rings having each an annular body, said body having parallel sides, a raised shoulder portion disposed centrally about the periphery of said annular body, a plurality of raised circular portions symmetrically disposed exteriorly of said shoulder portion, and a radial bore disposed through each of said raised circular portions, each of said bores having a trailing edge of larger radius than the rest of the bore.

7. In apparatus substantially as described, spacing rings having each an annular body, a raised central annular portion formed integrally with said body, a plurality of evenly spaced bores formed transversely through said raised central portion, a plurality of raised evenly spaced cylindrical segments extending outwardly from the periphery of said raised central portion, and a bore radially disposed through each of said cylindrical segments, said bore having a peripheral trailing edge of greater radius than the rest of the bore.

8. Means for presenting fruit to be processed to a fruit processing device in spaced relationship, comprising a frame, a hopper supported thereon having apertured parallel sides and a movable bottom pivotally fixed therebetween, said bottom having downwardly sloping side portions inwardly terminating in upwardly sloping central portions having an apical line of intersection midway of and parallel to said sides, a shaft rotatably journaled in said frame, cranks disposed fixedly upon said shaft, connecting means upon said cranks forming pivotal links to said side portions of said bottom, a crank fixed upon said shaft having a terminal roller, a main shaft journaled through said frame, a star wheel fixed thereon, said crank and roller being positioned to engage the periphery of said star wheel, driving drums disposed terminally upon said main shaft, a plurality of endless conveying chains disposed thereabout and in drivable relation thereto, a driven shaft journaled through said frame, means for driving said driven shaft from said main shaft, a plurality of spacing rings supported upon said driven shaft forming drums alined with said apertured hopper sides, radial apertures evenly spaced about said rings adapted to receive fruit to be processed by action of gravity only, means for ejecting said fruit at a desired point, and guideways externally associated with said drums at said point.

ELLSWORTH W. CARROLL.